United States Patent [19]

Kishida et al.

[11] Patent Number: 4,464,513
[45] Date of Patent: Aug. 7, 1984

[54] DELUSTERED THERMOPLASTIC RESIN COMPOSITION

[75] Inventors: Kazuo Kishida, Ohtake; Akira Hasegawa, Hiroshima; Masahiro Sugimori, Ohtake, all of Japan

[73] Assignee: Mitsubishi Rayon Company, Limited, Tokyo, Japan

[21] Appl. No.: 400,619

[22] Filed: Jul. 22, 1982

Related U.S. Application Data

[63] Continuation-in-part of Ser. No. 173,617, Jul. 30, 1980, abandoned.

[30] Foreign Application Priority Data

Aug. 21, 1979 [JP] Japan ................................. 54-106262

[51] Int. Cl.$^3$ ........................ C08L 27/06; C08L 33/06
[52] U.S. Cl. ..................................... 525/227; 525/239
[58] Field of Search ................................. 525/227, 239

[56] References Cited

U.S. PATENT DOCUMENTS 3,345,434 10/1967 Griffith .............................. 525/229

Primary Examiner—John C. Bleutge
Assistant Examiner—A. L. Carrillo
Attorney, Agent, or Firm—Oblon, Fisher, Spivak, McClelland & Maier

[57] ABSTRACT

A delustered thermoplastic resin composition obtained by incorporating in 100 parts by weight of a thermoplastic resin up to 40 parts by weight of a cross-linked polymer having an average particle diameter of 35–500μ which polymer is obtained by suspension-polymerizing a non-crosslinking monomer composition comprising 50–70 wt. % of a vinyl aromatic monomer, 10–40 wt. % of at least one monomer selected from the group consisting of alkyl acrylates having 1–13 carbon atoms in the alkyl group, 10–40 wt. % of a monomer selected from alkyl methacrylates having 1–4 carbon atoms in the alkyl group and 0–40 wt. % of another monoethylenically unsaturated monomer with 0.5–5 parts by weight, per 100 parts by weight of the non-cross-linking monomer composition, of a cross-linking monomer having at least two double bonds in the molecule.

8 Claims, No Drawings

DELUSTERED THERMOPLASTIC RESIN COMPOSITION

CROSS-REFERENCE TO RELATED APPLICATIONS

This application is a continuation-in-part of application Ser. No. 173,617, filed July 30, 1980, now abandoned.

BACKGROUND OF THE INVENTION

1. Field of the Invention

The present invention relates to a delustered thermoplastic resin composition.

2. Description of the Prior Art

Molded articles of thermoplastic resins such as vinyl chloride resin, ABS resin and acrylic resin are generally lustrous. The lusters are important properties sometimes according to the use. On the other hand, such lusters are unnecessary in other cases or, for some purposes, the lusters are unpreferred.

Conventional processes for delustering thermoplastic resins may be divided roughly into the following processes:

(1) Process wherein an inorganic or organic delustering agent is incorporated therein, and (2) Process wherein an after treatment such as delustering treatment is effected.

Process (2) is unsuitable in many cases when the fabrication is to be effected subsequently because of its poor productivity, high processing costs and insufficient delustering effect obtained, though deterioration in physical properties is small. Process (1) has a serious problem of a reduction in physical properties, though the productivity is substantially not reduced and delustering degree can be controlled according to this process and this process can be employed when the fabrication is to be effected subsequently. Particularly when an inorganic substance such as silica gel or calcium silicate is used as the delustering agent, physical properties such as impact resistance and load elongation are remarkably deteriorated and in many cases, the product thus obtained can not be used practically. On the other hand, as processes wherein an organic delustering agent, particularly, high molecular delustering agent, is used, there have been known (a) a process wherein liquid polybutadiene is used and (b) a process wherein an endopolymerization product of a mixture of cross-linked styrene/alkyl acrylate copolymer having an average particle diameter of 1–30μ and a non-cross-linked resin is used. The former process invites a reduction in heat distortion temperature unfavorably. As for the latter process, in fact, it is quite difficult to obtain particles of the above average diameter of 1–30μ by the ordinary emulsion polymerization or suspension polymerization. Further, the particles of such a size are too small to exhibit a sufficient delustering effect in the delustering treatment of ABS resin and polyvinyl chloride (PVC). In addition, the non-cross-linked resin introduced therein by the complicated endopolymerization technique reduces the delustering effect on the ABS and PVC to make the effects of the delustering agent insufficient, though the non-cross-linked resin increases compatibility thereof with ABS and PVC.

In U.S. Pat. No. 3,311,582, it is instructed to use methyl methacrylate-styrene type cross-linking polymer (this polymer may include 10% by weight or less of acrylic ester or methacrylic ester other than methyl methacrylate) having an average particle size of 0.1–0.5μ as an coating type delustering agent. However, such a delustering agent having an average particle size of 0.1 to 0.5μ is almost ineffective as a blending type delustering agent, though it is effective as a coating type delustering agent. Further, it is essential to copolymerize 10–40%, preferably 20–30% by weight of an acrylic ester with methyl methacrylate, styrene and cross-linking monomer in order to obtain an useful delustering agent.

In U.S. Pat. No. 3,345,434, it is instructed to use a cross-linked methyl methacrylate polymer or a cross-linked methyl methacrylate-acrylic ester copolymer obtained by suspension polymerization as a delustering agent. However, such a cross-linked methyl methacrylate type polymer acts ineffectively to polyvinylchloride resin etc., even if it acts effectively to methyl methacrylate type resin. In order to obtain an useful delustering agent to polyvinylchloride, it is essential to polymerize monomer mixtures composed of a major component of vinyl aromatic monomer and a minor component of acrylic ester, preferably 3 component of vinyl aromatic monomer, acrylic ester and methacrylic ester.

Generally, in the delustering agents of a type to be incorporated in a substance to be delustered, it has been said that the delustering effect thereof runs counter to compatibility thereof with the thermoplastic resin. This fact has heretofore inhibited the development of a delustering agent having both the delustering effect and physical properties-maintaining effect.

SUMMARY OF THE INVENTION

The object of the present invention is to provide a novel delustering agent which causes only very slight deterioration in physical properties and which can be produced on an industrial scale.

Another object of the present invention is to provide a polymer having both delustering effect and compatibility by a very easy means such as suspension polymerization.

PREFERRED EMBODIMENT OF THE INVENTION

The present invention relates to a delustered thermoplastic resin composition obtained by incorporating in a thermoplastic resin a cross-linked polymer having an average particle diameter of 35–500μ which polymer is obtained by suspension-polymerizing a non-cross-linking monomer composition comprising 50–70 wt. %, preferably 50–60 wt. % of a vinyl aromatic monomer, 10–40 wt. %, preferably 20–30 wt. % of an alkyl acrylate having 1–13 carbon atoms in the alkyl group, 10–40 wt. %, preferably 10–20 wt. % of alkyl methacrylate having 1–4 carbon atoms in the alkyl group and 0–40 wt. %, preferably 0–10 wt. % of another monoethylenically unsaturated monomer with 0.5–5 parts, preferably 1.5–4 parts by weight, per 100 parts by weight of the non-cross-linking monomer composition, of a cross-linking monomer having at least two double bonds in the molecule.

One of the characteristic features of the present invention resides in the diameter of the resulting polymer particles. Namely, the greatest effects are exhibited with particles of an average diameter of 35–500μ, particularly 40–200μ. If the average particle size is less than 35μ, the delustering effects are insufficient. On the other hand, if the average particle size is more than 500μ, the resultant molded articles have rough surfaces and it becomes difficult to effect the uniform delustering effect.

As to the monomers to be copolymerized for obtaining the cross-linked polymer, there is a suitable range of proportion thereof as will be described below. If the monomers are used in amounts outside said range, the physical properties are seriously damaged, though some delustering effect is obtained or, alternatively, the delustering effect obtained is only insufficient. Either way, it is surprising that polymers having both delustering effect and compatibility with thermoplastic resins can be obtained by a quite simple method such as the conventional suspension polymerization. Though the mechanism thereof has not been completely elucidated yet, it is considered that this fact is due to the composition distribution and cross-linking distribution in the resulting polymer particles.

Now, the description will be made on the monomer composition suitable for obtaining the cross-linked polymers used as the delustering agents in the present invention.

The monomers used for the production of the cross-linked polymers in the present invention may be divided roughly into non-cross-linking monomers and cross-linking monomers.

As the non-cross-linking monomers, there may be mentioned vinyl aromatic monomers, acrylic acid esters, methacrylic acid esters and, if necessary, other monoethylenically unsaturated monomers. They are used in amounts of 50–70 wt. %, preferably 50–60 wt. % of the vinyl aromatic monomer, 10–40 wt. %, preferably 20–30 wt. % of the alkyl acrylate having 1–13 carbon atoms in the alkyl group, 10–40 wt. %, preferably 10–20 wt. % of alkyl methacrylate having 1–4 carbon atoms in the alkyl group and less than 40 wt. %, preferably less than 10 wt. % of the other monoethylenically unsaturated monomer.

The vinyl aromatic monomers include styrene, vinyltoluene, α-methylstyrene and halogenated styrenes.

The (meth)acrylic acid esters include preferably lower (meth)acrylic acid esters such as ethyl acrylate, n-butyl acrylate, 2-ethylhexyl acrylate, methyl methacrylate, ethyl methacrylate and butyl methacrylate.

The other monoethylenically unsaturated monomers include methacrylic acid, fumaric acid, maleic acid and copolymerizable carboxylic acids and their esters excluding the alkyl (meth)acrylates having 1–13 carbon atoms in the alkyl group, vinyl halides such as vinyl chloride and vinyl bromide, vinyl esters such as vinyl acetate and acrylonitrile.

As the cross-linking monomers, there may be used compounds having at least 2 unsaturated bonds in the molecule. Among them, compounds wherein at least one of the two or more unsaturated bonds is allyl group are preferred. By the use of such allyl group-containing cross-linking monomers, it becomes possible to realize a suitable cross-linking composition distribution in the cross-linked polymers. As typical allyl group-containing cross-linking monomers, there may be mentioned allyl methacrylate, triallyl cyanurate and triallyl isocyanurate.

As other cross-linking monomers, there may be mentioned unsaturated carboxylic acid esters of alkylene glycols such as ethylene glycol dimethacrylate, unsaturated alcohol ethers of alkylene glycols such as propylene glycol diallyl ether and polyvinylbenzenes such as divinyl-benzene.

The cross-linking monomers are used in an amount of 0.5–5 parts by weight, particularly 1.5–4 parts by weight, per 100 parts by weight of the non-cross-linking monomers.

As initiators used in the suspension polymerization, there may be mentioned those generally used in the suspension polymerization in the prior art. As typical initiators, there may be mentioned organic peroxides such as benzoyl peroxide and lauroyl peroxide and azo compounds such as azobisisobutyronitrile.

As suspension stabilizers, there may be mentioned those generally used in the prior art. As typical suspension stabilizers, there may be mentioned organic colloidal high molecular substances such as polyvinyl alcohol, polyacrylic acid salts, carboxymethyl cellulose, gelatin and tragacanth, and inorganic colloidal substances such as barium sulfate, magnesium carbonate and calcium phosphate as well as combinations of them with surfactants.

The suspension polymerization is carried out generally by suspending the monomers in water together with a polymerization initiator in the presence of a suspension stabilizer. In another manner of the polymerization, a polymer soluble in the monomer may be dissolved therein prior to the polymerization. In still another manner of the polymerization, the bulk polymerization is carried out partially in the absence of the cross-linking monomer and then the suspension polymerization is carried out in the presence of the cross-linking monomer and the suspension stabilizer.

As a matter of course, a polymerization regulator such as n-octylmercaptan or t-dodecylmercaptan can be used in the polymerization. It is rather preferred in many cases to control the molecular weight distribution with the regulator.

As typical thermoplastic resins which can be delustered by incorporating the delustering agent (cross-linked polymer) used in the present invention, there may be mentioned vinyl chloride resin, ABS resin, acrylic resin, methacrylic resin, methyl methacrylate/-butadiene/styrene resin (MBS resin), nylon, polyethylene, polyethylene terephthalate, polycarbonate, polyurethane, polystyrene and polypropylene.

The delustering agent is incorporated in the thermoplastic resin in an amount of preferably less than 40 parts by weight. The effects thereof can be exhibited sufficiently even in an amount of as small as less than 10 parts by weight.

If necessary, general additives such as a stabilizer, lubricant, processing aid, high impact resistance aid, plasticizer, foaming agent, filler and coloring agent may be incorporated in the composition of the present invention.

In the following examples, parts are given by weight.

EXAMPLE 1

(1) Preparation of cross-linked polymer (A):

The following compounds are charged in a reaction vessel provided with a stirrer, reflux condenser and nitrogen gas inlet:

| | |
|---|---|
| Styrene | 60 parts |
| n-Butyl acrylate | 20 |
| Methyl methacrylate | 20 |
| Allyl methacrylate | 3.0 |
| t-Dodecylmercaptan | 0.1 |
| Lauroyl peroxide | 0.5 |
| Polyvinyl alcohol | 1.0 |

-continued

| | |
|---|---|
| Water | 200 |

After sufficiently replacing the gas in the reaction vessel with nitrogen gas, the mixture of the above compounds was heated to 75° C. under stirring to carry out the polymerization in nitrogen gas stream. After 3 hours, the temperature was elevated to 85° C. and the mixture was kept at that temperature for three hours and then the temperature was elevated to 95° C. and the mixture was kept at that temperature for one hour to complete the polymerization. After dehydration followed by drying, cross-linked polymer (A) was obtained in the form of beads.

The resulting beads had the following particle size distribution and an average particle diameter of 77μ.

| Mesh | wt. % |
|---|---|
| Lower than 32 | 3.4 |
| 32–48 | 13.3 |
| 48–100 | 57.1 |
| 100–150 | 15.1 |
| 150–200 | 7.6 |
| 200–250 | 3.1 |
| 250–400 | 0.3 |
| Higher than 400 | 0.1 |

(2) Preparation of delustered thermoplastic resin composition (example of the incorporation of the delustering agent into rigid PVC):

100 Parts of polyvinyl chloride ($\bar{P}=720$) were mixed with 3 parts of a stabilizer (dibutyltin maleate), 10 parts of a high impact resistance aid (METABLEN ®C-102; a product of Mitsubishi Rayon Co.), 1.0 part of a processing aid (METABLEN ®P-551; a product of Mitsubishi Rayon Co.), 1 part of a lubricant (n-butyl stearate) and 5 parts of cross-linked polymer (A) obtained in above process (1). The whole was kneaded by means of rolls at 165° C. and 60° specular gloss of the product was measured. Then, the mixture kneaded with the rolls was shaped into a plate of a thickness of 2.5 mm at 165° C. under a pressure of 70 tons and V-notch Izod impact strength thereof was measured to obtain the results shown in Table 1.

For comparison, the measurement results of the four kinds of the composition having the same resin composition except that the cross-linked polymer (A) is not contained, 5 parts of silica gel, is contained in place of the cross-linked polymer (A), 5 parts of a commercial delustering agent is contained in place of the cross-linked polymer (A) or 5 parts of only fractions of the cross-linked polymer (A) which passed a 500 mesh sieve (25μ) is contained in place of the cross-linked polymer (A) as obtained are also shown in Table 1-(1).

It is apparent from Table 1-(1) that cross-linked polymer (A) used in the present invention exhibits a superior delustering property and impacts a superior impact resistance as compared with those of silica gel and the commercial delustering agent. If the average particle diameter of the cross-linked polymer is less than 35μ as in Comparative Example (4), the delustering effect thereof is very poor.

TABLE 1-(1)

| | Izod impact value (Kg.cm/cm) | 60° Gloss (%) |
|---|---|---|
| Example 1 | 17.2 | 23 |
| Comparative Example (1) (free of delustering agent) | 20.7 | 83 |
| Comparative Example (2) (containing silica gel) | 0.7 | 48 |
| Comparative Example (3) (containing a commercial delustering agent) | 11.0 | 41 |
| Comparative Example (4) (containing fractions of the cross-linked polymer (A) which passed a 500 mesh sieve; average particle diameter 14μ) | 16.7 | 57 |

(3) Variation in effects of delustering agent on rigid PVC depending on particle sizes:

Cross-linked polymer (A) was sieved to divide the same into groups shown in Table 1-(2). Compositions were prepared in the same manner as in Example 1-(2) except that the respective fractions of polymer (A) were used. 60° Specular glosses of them were measured in the same manner as above to obtain the results shown in Table 1-(2).

It is apparent from Table 1-(2) that the delustering effects of the cross-linked polymer having a particle diameter of larger than 500μ or smaller than 35μ are very poor.

TABLE 1-(2)

| Particle size | Average particle diameter (ν) | 60° Gloss |
|---|---|---|
| Lower than 32 mesh (Larger than 500μ) | 600 | 64 |
| 32–48 mesh (297–500μ) | 345 | 43 |
| 48–100 mesh (149–297μ) | 196 | 31 |
| 100–150 mesh (105–149μ) | 123 | 25 |
| 150–250 mesh (63–105μ) | 82 | 22 |
| 250–400 mesh (37–63μ) | 48 | 28 |
| Higher than 400 mesh (Smaller than 37μ) | 17 | 55 |

EXAMPLE 2

Cross-linked polymers were obtained by the polymerization reaction in the same manner as in Example 1-(1) except that non-cross-linking monomer compositions as shown in Table 2 were used, 0.2 part of t-dodecylmercaptan was used in place of 0.1 part of n-octylmercaptan and 0.5 part of polyvinylalcohol was used in place of 1.0 part of the same. The resulting particles had an average particle diameter of around 150μ according to microphotographs in all cases.

Compositions were prepared in the same manner as in Example 1-(2) except that the respective cross-linked polymers thus obtained were used. The compositions were kneaded with rigid PVC by means of rolls and compression-molded and glosses and Izod impact strengths of the molded articles were determined. The surface conditions (roughness, uniformity, etc.) were evaluated visually as the standards of the evaluation of dispersibilities.

The results are shown in Table 2 together with the results of comparative examples (wherein the compositions are beyond the range of the invention).

TABLE 2

| | Non-cross-linking monomer composition | | | | | | Physical properties of the composition | | |
|---|---|---|---|---|---|---|---|---|---|
| | Styrene | Ethyl acrylate | n-Butyl acrylate | 2-Ethyl-hexyl acrylate | Methyl meth-acrylate | Acrylo-nitrile | 60° Gloss | Izod impact strength | Surface Condi-tion |
| Experiment (1) | 60 | | 20 | | 20 | | 26 | 17.5 | ⊚ |
| Experiment (2) | 50 | 20 | 10 | | 20 | | 25 | 14.9 | ○ |
| Experiment (3) | 50 | 30 | | | 10 | 10 | 24 | 14.7 | ○ |
| Comp. Ex. (1) | 100 | | | | | | 19 | 8.7 | X |
| Comp. Ex. (2) | 40 | | | | | 60 | 14 | 5.2 | X |

EXAMPLE 3

60 Parts of styrene, 20 parts of n-butyl acrylate, 20 parts of methylmethacrylate, 0.5 part of benzoyl peroxide, 1.0 part of calcium tertiary phosphate, 0.01 part of a surfactant, 200 parts of water and a cross-linking monomer in an amount shown in Table 3 were charged in the same reaction vessel as in Example 1-(1) to obtain a cross-linked polymer in the same manner as in Example 1-(1). The resulting cross-linked polymers had an average particle diameter of around 100μ.

Compositions were prepared in the same manner as in Example 1-(2) except that the respective cross-linked polymers thus obtained were used. Physical properties of then were evaluated in the same manner as in Example 1-(2) and Example 2 to obtain the results shown in Table 3.

TABLE 3

| | Cross-linking monomer | | | | Physical properties of the composition | | |
|---|---|---|---|---|---|---|---|
| | Allyl methyacrylate | Triallyl cyanurate | BDMA | Divinyl-benzene | 60° Gloss | Izod impact strength | Surface condition |
| Experiment (1) | 1 | | | | 38 | 18.9 | ⊚ |
| Experiment (2) | 2 | | | | 27 | 17.8 | ⊚ |
| Experiment (3) | 4 | | | | 24 | 17.1 | ⊚ |
| Experiment (4) | | 4 | | | 29 | 18.7 | ⊚ |
| Experiment (5) | | | 4 | | 21 | 15.2 | ○ |
| Experiment (6) | | | | 4 | 25 | 15.8 | ○ |
| Experiment (7) | 2 | | 2 | | 23 | 16.4 | ○ |
| Comp. Ex. (1) | (Cross-linking monomer was not used) | | | | 55 | 19.5 | ○ |
| Comp, Ex. (2) | 6 | | | | 19 | 10.6 | X |

BDMA: Butylene glycol dimethacrylate

EXAMPLE 4

100 Parts of a resin of film-forming methyl methacrylate polymer (a product of Mitsubishi Rayon Co.) were mixed with 8 parts of cross-linked polymer (A) obtained in Example 1. The composition was extruded through an extruder having a screw of a diameter of 40 mm at 230° C. and cut into pellets. The resulting pellets were dried and shaped into a film of a thickness of about 50μ by T-die method by means of the same extruder as above at 230° C. 60° Specular gloss and physical property (Tear strength) of the film were evaluated to obtain the results shown in Table 4. For comparison, pellets were prepared in the same manner as above except that cross-linked polymer (A) was not used and then the pellets were shaped into a film, the properties of which were also examined to obtain the results also shown in Table 4.

TABLE 4

| | 60° Gloss | Tear strength (Kg/cm) |
|---|---|---|
| Example 4 | 21 | 1.79 |
| Comparative Example (free of delustering agent) | 88 | 1.75 |

It is apparent from Table 4 that when the cross-linked polymer of the present invention was incorporated in the film-forming methyl methacrylate polymer resin, an excellent delustering effect was exhibited without substantially deteriorating the film-forming properties thereof or physical properties of the resulting film.

EXAMPLE 5

The following compounds were charged in the same reaction vessel as in Example 1-(1) and procedure of Example 1-(1) was repeated to obtain cross-linked polymers in the form of beads.

| | |
|---|---|
| Styrene<br>n-Butyl acrylate<br>Methyl methacrylate | Amount (Parts) shown in Table 5 |
| Allyl methacrylate | 3.0 parts |
| t-Dodecylmercaptan | 0.1 |
| Lauroyl peroxide | 1.0 |
| Polyvinyl alcohol | 1.0 |
| Water | 200 |

The resulting particles had an average particle diameter of around 100μ.

Compositions were prepared in the same manner as in Example 1-(2) except that the respective cross-linked polymers thus obtained were used. Properties of them were evaluated in the same manner as in Example 1-(2) to obtain the results shown in Table 5.

TABLE 5

| | Non-cross-linking monomer composition | | | Physical properties of the composition | | |
|---|---|---|---|---|---|---|
| | Styrene | n-Butyl acrylate | Methyl methacrylate | 60° Gloss | Izod impact strength | Surface condition |
| Experiment 1 | 70 | 20 | 10 | 32 | 16.1 | ◉ |
| Experiment 2 | 50 | 40 | 10 | 28 | 15.8 | ○ |
| Experiment 3 | 50 | 25 | 25 | 31 | 17.7 | ◉ |
| Experiment 4 | 50 | 10 | 40 | 24 | 13.6 | ○ |

COMPARATIVE EXAMPLE 1

As comparative example, following compounds were charged in the same reaction vessel as in Example 1-(1):

| | |
|---|---|
| Styrene | 60 parts |
| n-Butyl acrylate | 20 |
| Methyl methacrylate | 20 |
| Allyl methacrylate | 2.5 |
| n-Octylmercaptan | 0.1 part |
| Potassium persulfate | 0.3 |
| Emulsifier | 2.0 parts |

After sufficiently replacing the gas in the reaction vessel with nitrogen gas, the mixture of the above compounds was heated to 70° C. under stirring and kept at that temperature for 5 hours to complete the emulsion polymerization.

The particles in the resulting latex had a diameter of 0.2–0.4μ according to photo-extinction method. 5 Parts of calcium chloride were added to the latex to effect the salting-out. After dehydration, washing with water and drying, a cross-linked polymer in the form of a powder was obtained. A composition was obtained in the same manner as in Example 1-(2) except that the powdery cross-linked polymer obtained by the above method was used, or no said polymer was used. 60° Specular gloss of the product was examined. The results are shown in Table 6.

TABLE 6

| | Amount of the powdery cross-linked polymer | 60° Gloss |
|---|---|---|
| Experiment 1 | 5 parts | 77 |
| Experiment 2 | 25 parts | 73 |
| Experiment 3 | None | 83 |

It is apparent from Table 6 that the particles of small diameters as obtained by the emulsion polymerization have substantially no delustering effect.

What is claimed is:

1. A delustered thermoplastic resin composition obtained by incorporating in 100 parts by weight of a polyvinyl chloride, a cross-linked polymer in an amount, the minimum of which is sufficient to impart a significant delustering effect to said polyvinyl chloride, up to 40 parts by weight and having an average particle diameter of 35–500μ which polymer is obtained by suspension-polymerizing a non-cross-linking monomer composition comprising 50–70 wt. % of a vinyl aromatic monomer, 10–40 wt. % of at least one monomer selected from the group consisting of alkyl acrylates having 1–13 carbon atoms in the alkyl group, 10–40 wt. % of a monomer selected from alkyl methacrylates having 1–4 carbon atoms in the alkyl group and 0–40 wt. % of another mono-ethylenically unsaturated monomer with 0.5–5 parts by weight, per 100 parts by weight of the non-cross-linking monomer composition, of a cross-linking monomer having at least two double bonds in the molecule.

2. A delustered thermoplastic resin composition obtained by incorporating in 100 parts by weight of a from 5 parts by weight up to 40 parts by weight of a cross-linked polymer having an average particle diameter of 35–500μ which polymer is obtained by suspension-polymerizing a non-cross-linking monomer composition comprising 50–60 wt. % of a vinyl aromatic monomer, 20–30 wt. % of at least one monomer selected from the group consisting of alkyl acrylates having 1–13 carbon atoms in the alkyl group, 10–20 wt. % of a monomer selected from alkyl methacrylates having 1–4 carbon atoms in the alkyl group, and 0–10 wt. % of another monoethylenically unsaturated monomer with 1.5–4 parts by weight, per 100 parts by weight of the non-cross-linking monomer composition, of a cross-linking monomer having at least two double bonds in the molecule.

3. A delustered thermoplastic resin composition according to claim 1, wherein the crosslinking monomer is a compound containing at least one allyl group.

4. A delustered thermoplastic resin composition according to claim 2, wherein the crosslinking monomer is a compound containing at least one allyl group.

5. A delustered thermoplastic resin composition according to claim 1, wherein said alkyl acrylate is at least one member selected from the group consisting of ethyl acrylate, n-butyl acrylate and 2-ethylhexyl acrylate.

6. A delustered thermoplastic resin composition according to claim 2, wherein said alkyl acrylate is at least one member selected from the group consisting of ethyl acrylate, n-butyl acrylate and 2-ethylhexyl acrylate.

7. A delustered thermoplastic resin composition according to claim 1, wherein average particle diameter of the cross-linked polymer is 40–200μ.

8. A delustered thermoplastic resin composition according to claim 2, wherein average particle diameter of the cross-linked polymer is 40–200μ.

* * * * *